US010587990B2

(12) United States Patent
Li et al.

(10) Patent No.: US 10,587,990 B2
(45) Date of Patent: Mar. 10, 2020

(54) CELL MULTICAST SERVICE PROCESSING METHOD AND DEVICE

(71) Applicant: HUAWEI TECHNOLOGIES CO., LTD., Shenzhen, Guangdong (CN)

(72) Inventors: Bingzhao Li, Beijing (CN); Yan Wang, Beijing (CN); Yongqiang Gao, Beijing (CN); Jian Zhang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 40 days.

(21) Appl. No.: 15/971,846

(22) Filed: May 4, 2018

(65) Prior Publication Data

US 2018/0255435 A1    Sep. 6, 2018

Related U.S. Application Data

(63) Continuation of application No. PCT/CN2015/093931, filed on Nov. 5, 2015.

(51) Int. Cl.
*H04W 4/06* (2009.01)
*H04W 76/40* (2018.01)
(Continued)

(52) U.S. Cl.
CPC .............. *H04W 4/06* (2013.01); *H04L 29/06* (2013.01); *H04W 68/005* (2013.01); *H04W 76/40* (2018.02)

(58) Field of Classification Search
CPC ....... H04W 24/08; H04W 36/26; H04W 4/06; H04W 36/0007; H04W 68/005; H04W 76/40
See application file for complete search history.

(56) References Cited

U.S. PATENT DOCUMENTS

2012/0039229 A1   2/2012  Etemad et al.
2015/0365963 A1*  12/2015  Won ................ H04W 28/0268
                                        370/329
(Continued)

FOREIGN PATENT DOCUMENTS

CN         1867181 A     11/2006
CN       101141669 A      3/2008
(Continued)

OTHER PUBLICATIONS

XP051026202 R3-152293 Huawei,"Introduction of SC-PTM",3GPP TSG-RAN WG3 Meeting #89bis,Sophia-Antipolis, France, Oct. 5-9, 2015,total 26 pages.
(Continued)

*Primary Examiner* — Mewale A Ambaye
(74) *Attorney, Agent, or Firm* — Womble Bond Dickinson (US) LLP

(57) ABSTRACT

The present disclosure relates to a cell multicast service processing method and a device. The method may include receiving, by a first base station, a multicast service session start message sent by a multicast coordination entity. The method may also include sending, by the first base station, a multicast service session start failure message or a multicast service session start response message to the MCE, where the multicast service session start failure message indicates that a multicast service fails to be started for all the cells that are managed by the first base station and for which a multicast service session is to be started, and the multicast service session start response message includes an identifier of a cell for which a multicast service is successfully started among the cells that are managed by the first base station and for which a multicast service session is to be started.

18 Claims, 8 Drawing Sheets

(51) Int. Cl.
    *H04L 29/06*     (2006.01)
    *H04W 68/00*     (2009.01)

(56) References Cited

U.S. PATENT DOCUMENTS

| | | | | |
|---|---|---|---|---|
| 2016/0249266 | A1* | 8/2016 | Kim | H04W 4/06 |
| 2018/0049156 | A1* | 2/2018 | Laha | H04W 4/06 |
| 2018/0077631 | A1* | 3/2018 | Byun | H04W 36/0061 |
| 2018/0324560 | A1* | 11/2018 | Xu | H04W 4/06 |

FOREIGN PATENT DOCUMENTS

| | | |
|---|---|---|
| CN | 101179765 A | 5/2008 |
| CN | 101227653 A | 7/2008 |
| CN | 102104836 A | 6/2011 |
| CN | 102143430 A | 8/2011 |
| CN | 102761831 A | 10/2012 |
| EP | 2061266 B1 | 11/2011 |
| KR | 20100069442 A | 6/2010 |

OTHER PUBLICATIONS

XP051006985 R3-151961 LG Electronics Inc.,"Discussion on service continuity for SC-PTM transmission",3GPP TSG-RAN WG3 Meeting #89bis,Sophia Antipolis, France, Oct. 5-9, 2015,total 4 pages.

XP050996021 3GPP TS 36.443 V13.1.0 (Sep. 2015), "3 Generation Partnership Project;Technical Specification Group Radio Access Network;Evolved Universal Terrestrial Radio Access Network (E-UTRAN);M2 Application Protocol (M2AP)(Release 13)",total 89 pages.

* cited by examiner

CELL MULTICAST SERVICE PROCESSING METHOD AND DEVICE

CROSS-REFERENCE TO RELATED APPLICATIONS

This disclosure is a continuation of International Application No. PCT/CN2015/093931, filed on Nov. 5, 2015, the disclosure of which is hereby incorporated by reference in its entirety.

TECHNICAL FIELD

The present disclosure relates to the communications field, and in particular, to a cell multicast service processing method and a device.

BACKGROUND

Single Cell Point To Multipoint (SC-PTM) is a multicast transmission technology. In SC-PTM, a base station needs to send multicast service data only to a cell that includes user equipment (UE) in an area covered by the base station, without a need to send multicast service data to a cell that does not include UE.

As shown in FIG. 1, an SC-PTM architecture includes: a broadcast/multicast service center (BM-SC) 110, an MBMS gateway (MBMS-GW) 120, a mobility management entity (MME) 130, a multi-cell/multicast coordination entity (MCE) 140, a base station 150, and UE 160. The BM-SC 110 is connected to the MBMS-GW 120. The MBMS-GW 120 is separately connected to the MME 130 and the base station 150. In addition, the MME 130 is separately connected to the MCE 140 and the base station 150, and the MCE 140 is further connected to the base station 150. The base station 150 manages one or more cells (not shown in the figure). The base station 150 can wirelessly communicate with the UE 160 in the cell.

Referring to FIG. 2, due to space constraints, the BM-SC 110 is omitted in FIG. 2. It is assumed that the MCE 140 manages a base station 1 and a base station 2, the base station 1 manages a cell 1, a cell 2, and a cell 3, and the base station 2 manages a cell 4, a cell 5, and a cell 6. The cell 1, the cell 2, the cell 3, the cell 4, and the cell 5 are cells for which a multicast service needs to be started. The BM-SC 110 sends a first multicast service session start (e.g. MBMS Session Start) message to the MBMS-GW 120. The first multicast service session start message includes identifiers of the cells 1 to 5 that are managed by the MBMS-GW 120 and for which a multicast service session needs to be started. After receiving the first multicast service session start message, the MBMS-GW 120 generates a second multicast service session start message according to the identifiers of the cells in the first multicast service session start message, and sends the second multicast service session start message to the MME 130. The second multicast service session start message includes the identifiers of the cells 1 to 5 that are managed by the MME 130 and for which a multicast service session needs to be started. After receiving the second multicast service session start message, the MME 130 generates a third multicast service session start message according to the identifiers of the cells in the second multicast service session start message, and sends the third multicast service session start message to the MCE 140. The third multicast service session start message includes the identifiers of the cells 1 to 5 that are managed by the MCE 140 and for which a multicast service session needs to be started. After receiving the third multicast service session start message, the MCE 140 generates a fourth multicast service session start message and a fifth multicast service session start message respectively for the base station 1 and the base station 2. The fourth multicast service session start message includes identifiers of the cells 1 to 3 that are managed by the base station 1 and for which a multicast service session needs to be started, and the fifth multicast service session start message includes identifiers of the cells 4 and 5 that are managed by the base station 2 and for which a multicast service session needs to be started. After receiving the fourth multicast service session start message, the base station 1 starts a multicast service for the cells 1 to 3 according to the identifiers of the cells 1 to 3 in the fourth multicast service session start message. If the multicast service is successfully started for one or more of the cells 1 to 3, the base station 1 returns a multicast service session start response (e.g. MBMS Session Start RSP) message to the MCE 140; if the multicast service fails to be started for all the cells 1 to 3, the base station 1 returns a multicast service session start failure (e.g. MBMS Session Start failure) message to the MCE 140. After receiving the fifth multicast service session start message, the base station 2 performs processing similar to that performed by the base station 1, and details are not described herein. If the MCE 140 receives the multicast service session start response messages returned by the base station 1 and/or the base station 2, the MCE 140 returns a multicast service session start response message to the MME 130; if the MCE 140 receives the multicast service session start failure messages returned by the base station 1 and the base station 2, the MCE 140 returns a multicast service session start failure message to the MME 130. If the MME 130 receives the multicast service session start response message, the MME 130 sends a multicast service session start response message to the MBMS-GW 120; if the MME 130 receives the multicast service session start failure message, the MME 130 sends a multicast service session start failure message to the MBMS-GW 120. If the MBMS-GW 120 receives the multicast service session start response message, the MBMS-GW 120 sends a multicast service session start response message to the BM-SC 110; if the MBMS-GW 120 receives the multicast service session start failure message, the MBMS-GW 120 sends a multicast service session start failure message to the BM-SC 110.

Therefore, in the prior art, the MCE 140 receives only one multicast service session start response message, regardless of a quantity of cells that are managed by the MCE 140 and for which a multicast service is successfully started, and the MCE 140 cannot know a specific cell that is managed by the MCE 140 and for which a multicast service is successfully started, or a specific cell that is managed by the MCE 140 and for which a multicast service fails to be started.

SUMMARY

To resolve the foregoing technical problems, embodiments of the present disclosure provide a cell multicast service processing method and a device, so that an MCE can learn of a specific cell for which a multicast service is successfully started.

A first aspect provides a cell multicast service processing method, including:

receiving, by a first base station, a multicast service session start message sent by a multicast coordination entity MCE, where the multicast service session start message includes identifiers of cells that are managed by the first base station and for which a multicast service session is to be started; and sending, by the first base station, a multicast service session start failure message or a multicast service session start response message to the MCE, where the multicast service session start failure message is used to indicate that a multicast service fails to be started for all the cells that are managed by the first base station and for which a multicast service session is to be started, and the multicast service session start response message includes an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to the first aspect, in a first possible embodiment of the first aspect, the multicast service session start message further includes identifiers of cells that are managed by a second base station and for which a multicast service session is to be started; and after the receiving, by a first base station, a multicast service session start message sent by an MCE, and before the sending, by the first base station, a multicast service session start failure message or a multicast service session start response message to the MCE, the method further includes:

starting, by the first base station, a multicast service according to the identifiers of the cells that are managed by the first base station and for which a multicast service session is to be started, and learning, according to the identifiers of the cells that are managed by the second base station and for which a multicast service session is to be started, the cells that are managed by the second base station and for which a multicast service is to be started.

With reference to the first possible embodiment of the first aspect, in a second possible embodiment of the first aspect, after the sending, by the first base station, a multicast service session start failure message or a multicast service session start response message to the MCE, the method includes:

receiving an identifier of a cell that is managed by the second base station and for which a multicast service is successfully started and/or an identifier of a cell that is managed by the second base station and for which a multicast service fails to be started, where the identifiers are sent by the MCE.

With reference to the first aspect, the first possible embodiment of the first aspect, or the second possible embodiment of the first aspect, in a third possible embodiment of the first aspect, after the receiving, by a first base station, a multicast service session start message sent by an MCE, the method includes:

sending, to the second base station if a multicast service fails to be started for one or more of the cells managed by the first base station, an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started; or sending, to the second base station, an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to any one of the first aspect, or the first to the third possible embodiments of the first aspect, in a fourth possible embodiment of the first aspect, the method further includes:

receiving an identifier of a cell for which a multicast service is successfully started among the cells that are managed by the second base station and for which a multicast service session is to be started, and/or an identifier of a cell for which a multicast service fails to be started among the cells that are managed by the second base station and for which a multicast service session is to be started, where the identifiers are sent by the second base station.

With reference to the fourth possible embodiment of the first aspect, in a fifth possible embodiment of the first aspect, after the receiving a multicast service session start message sent by a multicast coordination entity MCE and the receiving an identifier of a cell for which a multicast service is successfully started among the cells that are managed by the second base station and for which a multicast service session is to be started, and/or an identifier of a cell for which a multicast service fails to be started among the cells that are managed by the second base station and for which a multicast service session is to be started, where the identifiers are sent by the second base station, the method further includes:

sending a notification to user equipment UE, where the notification is used to notify the UE of the cell that is managed by the first base station and for which a multicast service is successfully started and/or the cell that is managed by the second base station and for which a multicast service is successfully started.

With reference to the fifth possible embodiment of the first aspect, in a sixth possible embodiment of the first aspect, the notification includes a bitmap indicator bit, and the bitmap indicator bit indicates the cell that is managed by the first base station and/or the second base station and for which a multicast service is successfully started.

A second aspect provides a cell multicast service processing method, including:

sending, by a multicast coordination entity MCE, a first multicast service session start message to a first base station, where the first multicast service session start message includes identifiers of cells that are managed by the first base station and for which a multicast service session is to be started; and receiving, by the MCE, a first multicast service session start failure message or a first multicast service session start response message that is returned by the first base station, where the first multicast service session start failure message is used to indicate that a multicast service fails to be started for all the cells that are managed by the first base station and for which a multicast service session is to be started, and the first multicast service session start response message includes an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to the second aspect, in a first possible embodiment of the second aspect, the first multicast service session start message further includes identifiers of cells that are managed by a second base station and for which a multicast service session is to be started, and the method further includes:

sending, by the MCE, a second multicast service session start message to the second base station, where the second multicast service session start message includes the identifiers of the cells that are managed by the second base station and for which a multicast service session is to be started; and receiving, by the MCE, a second multicast service session start failure message or a second multicast service session start response message that is returned by the second base station, where the second multicast service session start failure message is used to indicate that a multicast service fails to be started for all the cells that are managed by the second base station and for which a multicast service session is to be started, and the second multicast service session start response message includes an identifier of a cell for which a multicast service is successfully started among the cells that are managed by the second base station and for which a multicast service session is to be started, and/or an identifier of a cell for which a multicast service fails to be started among the cells that are managed by the second base station and for which a multicast service session is to be started.

With reference to the first possible embodiment of the second aspect, in a second possible embodiment of the second aspect, after the receiving, by the MCE, a first multicast service session start failure message or a first multicast service session start response message that is returned by the first base station, the method further includes:

sending, to the first base station, the identifier of the cell that is managed by the second base station and for which a multicast service is successfully started and/or the identifier of the cell that is managed by the second base station and for which a multicast service fails to be started.

With reference to the second possible embodiment of the second aspect, in a third possible embodiment of the second aspect, the method further includes: sending, by the MCE to a mobility management entity MME, at least one piece of the following information: the identifier of the cell that is managed by the first base station and for which a multicast service is successfully started, the identifier of the cell that is managed by the first base station and for which a multicast service fails to be started, the identifier of the cell that is managed by the second base station and for which a multicast service is successfully started, or the identifier of the cell that is managed by the second base station and for which a multicast service fails to be started.

A third aspect provides a cell multicast service processing method, including: determining, by a multicast coordination entity MCE, whether a received multicast service session start message sent by a mobility management entity MME includes identifiers of cells that are managed by the MCE and for which a multicast service session is to be started; and if the message does not include the identifiers, sending, by the MCE, a multicast service session start response message to the MME, where the multicast service session start response message includes indication information that is used to indicate that a cell list in the multicast service session start message is out of a management range of the MCE.

With reference to the third aspect, in a first possible embodiment of the third aspect, the multicast service session start response message is multicast service session start response information with an out-of-range mark, where the out-of-range mark is a field or a bit specified in the multicast service session start response information.

A fourth aspect provides a base station, where the base station is a first base station, and the first base station includes a receiver and a transmitter, where the receiver is configured to receive a multicast service session start message sent by a multicast coordination entity MCE, where the multicast service session start message includes identifiers of cells that are managed by the first base station and for which a multicast service session is to be started; and the transmitter is configured to send a multicast service session start failure message or a multicast service session start response message to the MCE, where the multicast service session start failure message is used to indicate that a multicast service fails to be started for all the cells that are managed by the first base station and for which a multicast service session is to be started, and the multicast service session start response message includes an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to the fourth aspect, in a first possible embodiment of the fourth aspect, the multicast service session start message further includes identifiers of cells that are managed by a second base station and for which a multicast service session is to be started, and the base station further includes a processor, where the processor is configured to: start a multicast service according to the identifiers of the cells that are managed by the first base station and for which a multicast service session is to be started, and learn, according to the identifiers of the cells that are managed by the second base station and for which a multicast service session is to be started, the cells that are managed by the second base station and for which a multicast service is to be started.

With reference to the first possible embodiment of the fourth aspect, in a second possible embodiment of the fourth aspect, the receiver is configured to receive an identifier of a cell that is managed by the second base station and for which a multicast service is successfully started and/or an identifier of a cell that is managed by the second base station and for which a multicast service fails to be started, where the identifiers are sent by the MCE.

With reference to the fourth aspect, the first possible embodiment of the fourth aspect, or the second possible embodiment of the fourth aspect, in a third possible embodiment of the fourth aspect, the transmitter is configured to send, to the second base station when a multicast service fails to be started for one or more of the cells managed by the first base station, an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started; or the transmitter is configured to send, to the second base station, an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to any one of the fourth aspect, or the first to the third possible embodiments of the fourth aspect, in a fourth possible embodiment of the fourth aspect, the receiver is configured to receive an identifier of a cell for which a multicast service is successfully started among the cells that are managed by the second base station and for which a multicast service session is to be started, and/or an identifier of a cell for which a multicast service fails to be started among the cells that are managed by the second base station and for which a multicast service session is to be started, where the identifiers are sent by the second base station.

With reference to the fourth possible embodiment of the fourth aspect, in a fifth possible embodiment of the fourth aspect, the transmitter is configured to send a notification to user equipment UE, where the notification is used to notify the UE of the cell that is managed by the first base station and for which a multicast service is successfully started and/or the cell that is managed by the second base station and for which a multicast service is successfully started.

With reference to the fifth possible embodiment of the fourth aspect, in a sixth possible embodiment of the fourth aspect, the notification includes a bitmap indicator bit, and the bitmap indicator bit indicates the cell that is managed by the first base station and/or the second base station and for which a multicast service is successfully started.

A fifth aspect provides a multicast coordination entity MCE, including a transmitter and a receiver, where the transmitter is configured to send a first multicast service session start message to a first base station, where the first multicast service session start message includes identifiers of cells that are managed by the first base station and for which a multicast service session is to be started; and the receiver is configured to receive a first multicast service session start failure message or a first multicast service session start response message that is returned by the first base station, where the first multicast service session start failure message is used to indicate that a multicast service fails to be started for all the cells that are managed by the first base station and for which a multicast service session is to be started, and the first multicast service session start response message includes an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started.

With reference to the fifth aspect, in a first possible embodiment of the fifth aspect, the first multicast service session start message further includes identifiers of cells that are managed by a second base station and for which a multicast service session is to be started; and the transmitter is configured to send a second multicast service session start message to the second base station, where the second multicast service session start message includes the identifiers of the cells that are managed by the second base station and for which a multicast service session is to be started; and the receiver is configured to receive a second multicast service session start failure message or a second multicast service session start response message that is returned by the second base station, where the second multicast service session start failure message is used to indicate that a multicast service fails to be started for all the cells that are managed by the second base station and for which a multicast service session is to be started, and the second multicast service session start response message includes an identifier of a cell for which a multicast service is successfully started among the cells that are managed by the second base station and for which a multicast service session is to be started, and/or an identifier of a cell for which a multicast service fails to be started among the cells that are managed by the second base station and for which a multicast service session is to be started.

With reference to the fifth aspect, in a second possible embodiment of the fifth aspect, the transmitter is configured to send, to the first base station, the identifier of the cell that is managed by the second base station and for which a multicast service is successfully started and/or the identifier of the cell that is managed by the second base station and for which a multicast service fails to be started.

With reference to the second possible embodiment of the fifth aspect, in a third possible embodiment of the fifth aspect, the transmitter is configured to send, to a mobility management entity MME, at least one piece of the following information: the identifier of the cell that is managed by the first base station and for which a multicast service is successfully started, the identifier of the cell that is managed by the first base station and for which a multicast service fails to be started, the identifier of the cell that is managed by the second base station and for which a multicast service is successfully started, or the identifier of the cell that is managed by the second base station and for which a multicast service fails to be started.

A sixth aspect provides a multicast coordination entity MCE, where the MCE includes a processor and a transmitter, where the processor is configured to: determine whether a received multicast service session start message sent by a mobility management entity MME includes identifiers of cells that are managed by the MCE and for which a multicast service session is to be started; and when none of the identifiers of cells that are managed by the MCE and for which a multicast service session is to be started is included, invoke the transmitter to send a multicast service session start response message to the MME, where the multicast service session start response message includes indication information that is used to indicate that a cell list in the multicast service session start message is out of a management range of the MCE.

With reference to the sixth aspect, in a first possible embodiment of the sixth aspect, the multicast service session start response message is multicast service session start response information with an out-of-range mark, where the out-of-range mark is a field or a bit specified in the multicast service session start response information.

According to the foregoing solution, in the present disclosure, a multicast service session start response message included in a multicast service session start response message returned to the MCE includes an identifier of a cell for which a multicast service is successfully started among the cells that are managed by the first base station and for which a multicast service session is to be started, and/or an identifier of a cell for which a multicast service fails to be started among the cells that are managed by the first base station and for which a multicast service session is to be started. Therefore, the MCE can learn of, according to the multicast service session start response message, the identifier of the cell for which a multicast service is successfully started among the cells that are managed by the first base station and for which a multicast service session is to be started, and/or the identifier of the cell for which a multicast service fails to be started among the cells that are managed by the first base station and for which a multicast service session is to be started, and then determine a specific cell that is managed by the MCE 140 and for which a multicast service is successfully started, or a specific cell that is managed by the MCE and for which a multicast service fails to be started.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
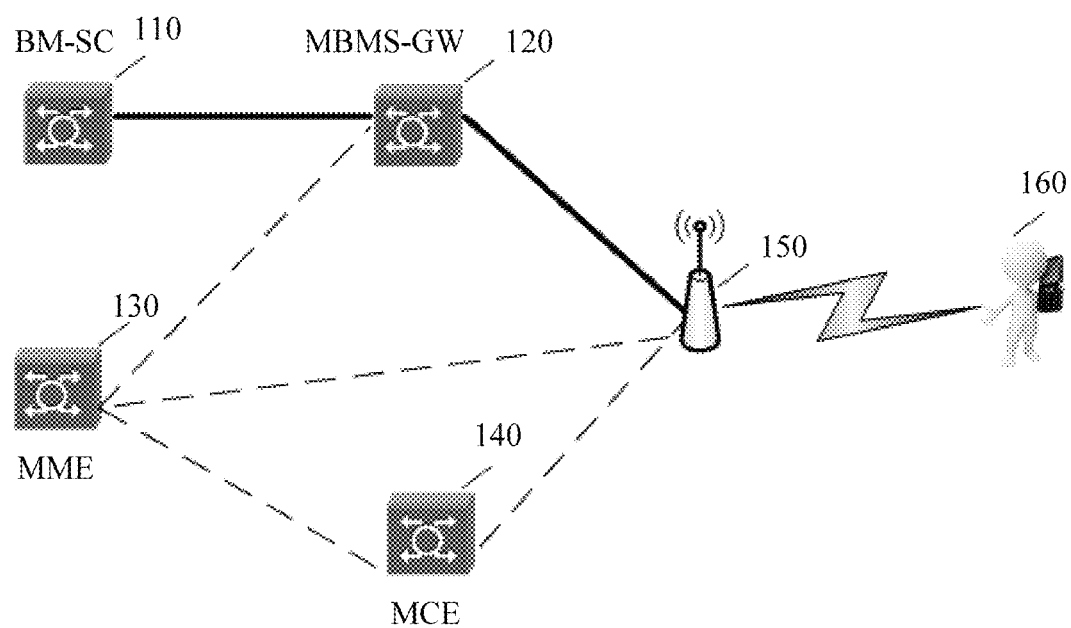
FIG. 1 is a schematic structural diagram of an SC-PTM architecture according to the prior art.
Figure 2:
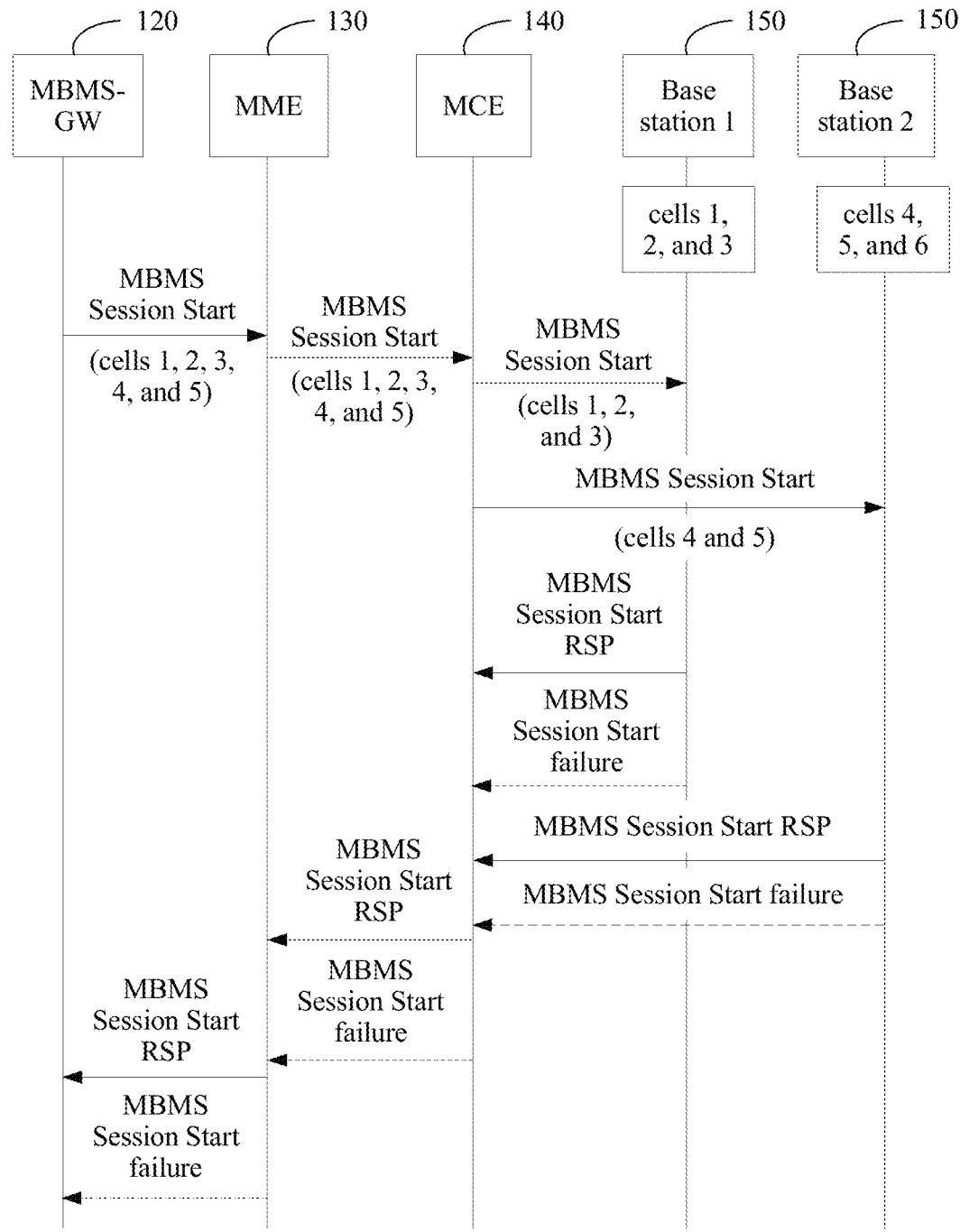
FIG. 2 is an interaction diagram of a multicast service based on an SC-PTM architecture according to the prior art.
Figure 3:
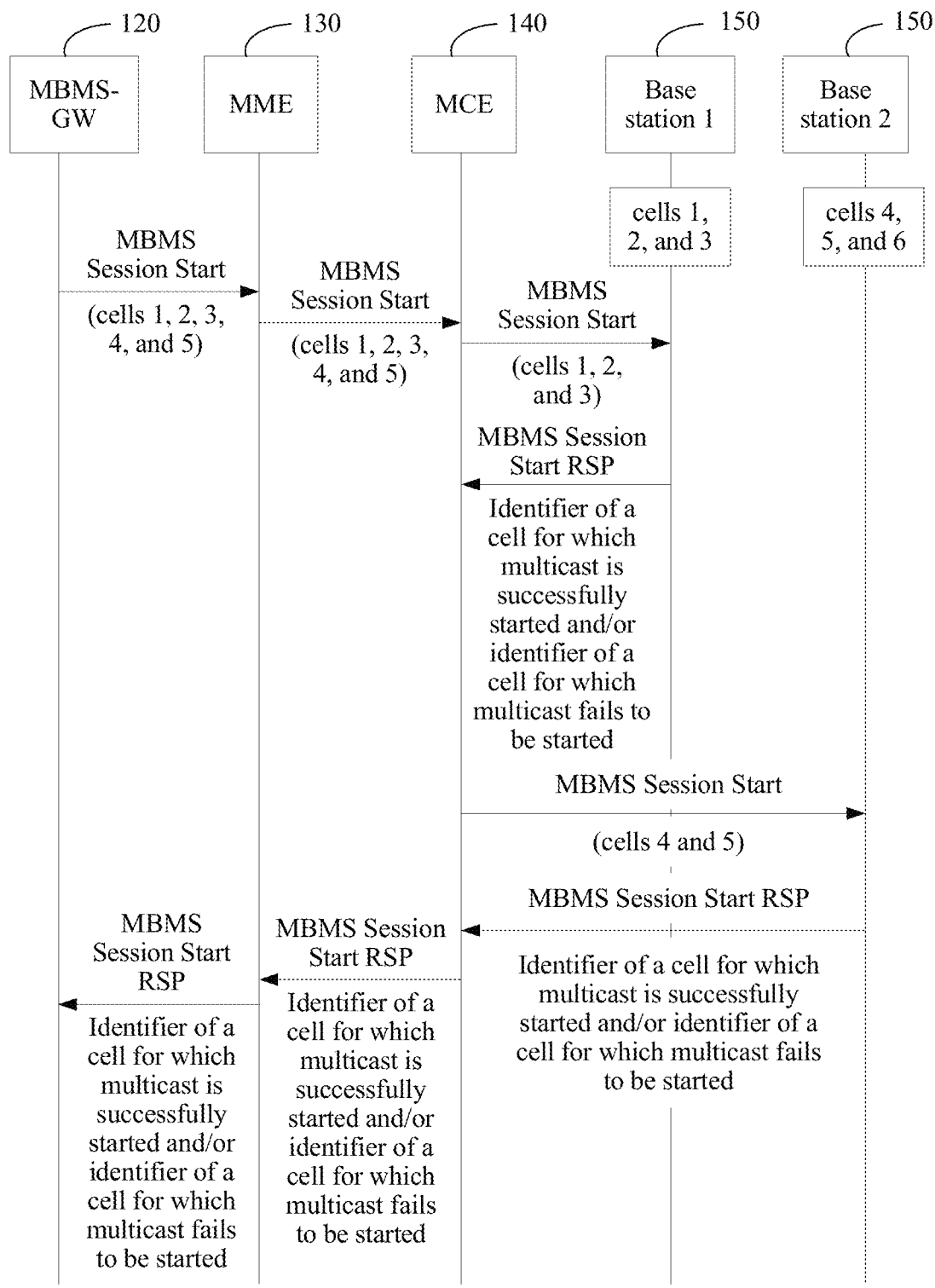
FIG. 3 is an interaction diagram of a multicast service based on an SC-PTM architecture according to the present disclosure.

Referring to FIG. 3, FIG. 3 is an interaction diagram of a multicast service based on an SC-PTM architecture according to the present disclosure. Due to space constraints, a BM-SC 110 is omitted in FIG. 3. It is assumed that an MCE 140 manages a base station 1 and a base station 2, the base station 1 manages a cell 1, a cell 2, and a cell 3, and the base station 2 manages a cell 4, a cell 5, and a cell 6. The cell 1, the cell 2, the cell 3, the cell 4, and the cell 5 are cells for which a multicast service needs to be started. In this embodiment, the base station 1 and the base station 2 are neighboring base stations managed by a same MCE 140. In other embodiments, the base station 1 and the base station 2 may be not neighboring base stations. It may be understood that a quantity of base stations 150 managed by the MCE 140 and a quantity of cells managed by the base stations 150 may be set according to factors such as transmit power, environments, and requirements of the MCE 140 and the base stations 150, and the quantities in this embodiment are merely examples instead of limitations.

The BM-SC 110 sends a first multicast service session start (e.g. MBMS Session Start) message to an MBMS-GW 120. The first multicast service session start message includes a multicast service quality requirement and identifiers of the cells 1 to 5 that are managed by the MBMS-GW 120 and for which a multicast service session needs to be started. The multicast service quality requirement includes at least one of the following: a quality of service identifier (QCI), a guaranteed bit rate (GBR), a maximum bit rate (MBR), a Allocation and Retention Priority (ARP), and so on.

After receiving the first multicast service session start message, the MBMS-GW 120 generates a second multicast service session start message according to the identifiers of the cells in the first multicast service session start message, and sends the second multicast service session start message to an MME 130. The second multicast service session start message includes a multicast service quality requirement and the identifiers of the cells 1 to 5 that are managed by the MME 130 and for which a multicast service session needs to be started.

After receiving the second multicast service session start message, the MME 130 generates a third multicast service session start message according to the identifiers of the cells in the second multicast service session start message, and sends the third multicast service session start message to the MCE 140. The third multicast service session start message includes a multicast service quality requirement and the identifiers of the cells 1 to 5 that are managed by the MCE 140 and for which a multicast service session needs to be started.

After receiving the third multicast service session start message, the MCE 140 determines whether a cell corresponding to a cell identifier included in the third multicast service session start message is within a management range of the MCE 140. If the cell identifier is out of the management range of the MCE 140, the MCE 140 returns, to the MME 130, a multicast service session start response message that does not carry the cell identifier, so as to indicate that the cell corresponding to the cell identifier in the third multicast service session start message is out of the management range of the MCE. It may be understood that the MCE 140 may alternatively return, to the MME 130, multicast service session start response information with an out-of-range mark, so as to indicate that the cell corresponding to the cell identifier in the third multicast service session start message is out of the management range of the MCE. The out-of-range mark may be a field, a bit, or the like specified in the multicast service session start response information. When the out-of-range mark is a field specified in the multicast service session start response information, a value in the field may be a manually preset value. For example, a preset value is "0001" or the like. When the out-of-range mark is a bit specified in the multicast service session start response information, a value of the bit may be "0" or "1" that is manually preset.

A fourth multicast service session start message and a fifth multicast service session start message are generated respectively for the base station 1 and the base station 2. The fourth multicast service session start message includes a multicast service quality requirement and the identifiers of the cells 1 to 3 that are managed by the base station 1 and for which a multicast service session needs to be started, and the fifth multicast service session start message includes a multicast service quality requirement and the identifiers of the cells 4 and 5 that are managed by the base station 2 and for which a multicast service session needs to be started.

After receiving the fourth multicast service session start message, the base station 1 determines, according to the identifiers of the cells in a cell list that are managed by the base station 1 and for which a multicast service session needs to be started, that a multicast service needs to be started for the cells 1 to 3, and then determines whether the cells 1 to 3 for which the multicast service needs to be started meet the multicast service quality requirement. There may be two cases according to whether the cells meet the multicast service quality requirement:

(1) If a multicast service that meets the multicast service quality requirement can be started for at least one of the cells 1 to 3, the base station 1 successfully starts the multicast service for a cell that can meet the multicast service quality requirement, and fails to start the multicast service for a cell that cannot meet the multicast service quality requirement. The base station 1 obtains, according to multicast service start statuses of the cells, an identifier of a cell that is managed by the base station 1 and for which a multicast service is successfully started and/or an identifier of a cell that is managed by the base station 1 and for which a multicast service fails to be started. For example, if a multicast service that meets the multicast service quality requirement can be started for the cell 1 and the cell 2 and a multicast service that meets the multicast service quality requirement cannot be started for the cell 3, the base station 1 successfully starts the multicast service for the cell 1 and the cell 2 and fails to start the multicast service for the cell 3. The base station 1 obtains, according to multicast service start statuses of the cells 1 to 3, an identifier of a cell that is managed by the base station 1 and for which a multicast service is successfully started, that is, the identifier of the cell 1 and the identifier of the cell 2, and/or an identifier of a cell that is managed by the base station 1 and for which a multicast service fails to be started, that is, the identifier of the cell 3. Then, the base station 1 encapsulates, into a first multicast service session start response message, the identifier of the cell that is managed by the base station 1 and for which a multicast service is successfully started and/or the identifier of the cell that is managed by the base station 1 and for which a multicast service fails to be started, and sends the first multicast service session start response message to the MCE 140. Optionally, the first multicast session start response message may also carry a failure cause of a cell for which a multicast service fails to be started, for example, one or a combination of the following: a resource is unavailable, a requested QCI is not supported, QoS (Quality of Service) is invalid, or the like.

(2) If none of the cells 1 to 3 meets the multicast service quality requirement, the base station 1 sends a first multicast service session start failure message to the MCE 140. The first multicast service session start failure message may carry or not carry an identifier of a cell that is managed by the base station 1 and for which a multicast service fails to be started. If the first multicast service session start failure message does not carry an identifier of a cell that is managed by the base station 1 and for which a multicast service fails to be started, after the MCE 140 receives the first multicast service session start failure message sent by the base station 1, the MCE 140 considers by default that a multicast service fails to be started for all the cells that are managed by the base station 1 and for which a multicast service needs to be started. If the first multicast service session start failure message needs to carry an identifier of a cell that is managed by the base station 1 and for which a multicast service fails to be started, the base station 1 encapsulates, into the first multicast service session start failure message, the identifier of the cell that is managed by the base station 1 and for which a multicast service fails to be started. Optionally, the base station 1 may also add, to the first multicast service session start failure message, a failure cause of a cell for which a multicast service fails to be started, for example, one or a combination of the following: a resource is unavailable, a requested QCI is not supported, QoS is invalid, or the like.

After receiving the fifth multicast service session start message sent by the MCE 140, the base station 2 performs processing similar to that performed by the base station 1, and details are not described herein.

The MCE 140 receives messages returned by the base station 1 and the base station 2. There may be four cases according to differences between the messages returned by the base station 1 and the base station 2 and received by the MCE 140:

(1) If a first multicast service session start response message returned by the base station 1 carries an identifier of a cell that is managed by the base station 1 and for which a multicast service is successfully started, the identifier of the cell that is managed by the base station 1 and for which a multicast service is successfully started can be obtained from the first multicast service session start response message returned by the base station 1. Alternatively, if a first multicast service session start response message returned by the base station 1 carries an identifier of a cell that is managed by the base station 1 and for which a multicast service fails to be started, the MCE 140 obtains, by subtracting the identifier of the cell that is managed by the base station 1 and for which a multicast service fails to be started from the identifiers of the cells that are managed by the base station 1 and for which a multicast service needs to be started, an identifier of a cell that is managed by the base station 1 and for which a multicast service is successfully started. After receiving a first multicast service session failure response message returned by the base station 2, the MCE 140 learns that a multicast service fails to be started for all the cells that are managed by the base station 2 and for which a multicast service needs to be started. The MCE 140 collects statistics based on this, to obtain an identifier of a cell that is managed by the MCE 140 (including those managed by the base station 1 and the base station 2) and for which a multicast service is successfully started and/or an identifier of a cell that is managed by the MCE 140 and for which a multicast service fails to be started, and encapsulates, into a second multicast service session start response message, the identifier of the cell that is managed by the MCE 140 and for which a multicast service is successfully started and/or the identifier of the cell that is managed by the MCE 140 and for which a multicast service fails to be started and sends the second multicast service session start response message to the MME 130.

(2) After receiving a first multicast service session failure response message returned by the base station 1, the MCE 140 learns that a multicast service fails to be started for all the cells that are managed by the base station 1 and for which a multicast service needs to be started. If a first multicast service session start response message returned by the base station 2 carries an identifier of a cell that is managed by the base station 2 and for which a multicast service is successfully started, after receiving the first multicast service session start response message returned by the base station 2, the MCE 140 obtains, from the first multicast service session start response message returned by the base station 2, the identifier of the cell that is managed by the base station 2 and for which a multicast service is successfully started. If a first multicast service session start response message returned by the base station 2 carries an identifier of a cell that is managed by the base station 2 and for which a multicast service fails to be started, the MCE 140 obtains, by subtracting the identifier of the cell that is managed by the base station 2 and for which a multicast service fails to be started from the identifiers of the cells that are managed by the base station 2 and for which a multicast service needs to be started, an identifier of a cell that is managed by the base station 2 and for which a multicast service is successfully started. The MCE 140 collects statistics based on this, to obtain an identifier of a cell that is managed by the MCE 140 (including those managed by the base station 1 and the base station 2) and for which a multicast service is successfully started and/or an identifier of a cell that is managed by the MCE 140 and for which a multicast service fails to be started, and encapsulates, into a second multicast service session start response message, the identifier of the cell that is managed by the MCE 140 (including those managed by the base station 1 and the base station 2) and for which a multicast service is successfully started and/or the identifier of the cell that is managed by the MCE 140 and for which a multicast service fails to be started and sends the second multicast service session start response message to the MME 130.

(3) If a first multicast service session start response message returned by the base station 1 carries an identifier of a cell that is managed by the base station 1 and for which a multicast service is successfully started, the identifier of the cell that is managed by the base station 1 and for which a multicast service is successfully started can be obtained from the first multicast service session start response message returned by the base station 1. Alternatively, if a first multicast service session start response message returned by the base station 1 carries an identifier of a cell that is managed by the base station 1 and for which a multicast service fails to be started, the MCE 140 obtains, by subtracting the identifier of the cell that is managed by the base station 1 and for which a multicast service fails to be started from the identifiers of the cells that are managed by the base station 1 and for which a multicast service needs to be started, an identifier of a cell that is managed by the base station 1 and for which a multicast service is successfully started. If a first multicast service session start response message returned by the base station 2 carries an identifier of a cell that is managed by the base station 2 and for which a multicast service is successfully started, after receiving the first multicast service session start response message returned by the base station 2, the MCE 140 obtains, from the first multicast service session start response message returned by the base station 2, the identifier of the cell that is managed by the base station 2 and for which a multicast service is successfully started. If a first multicast service session start response message returned by the base station 2 carries an identifier of a cell that is managed by the base station 2 and for which a multicast service fails to be started, the MCE 140 obtains, by subtracting the identifier of the cell that is managed by the base station 2 and for which a multicast service fails to be started from the identifiers of the cells that are managed by the base station 2 and for which a multicast service needs to be started, an identifier of a cell that is managed by the base station 2 and for which a multicast service is successfully started. The MCE 140 gathers the identifier of the cell that is managed by the base station 1 and for which a multicast service is successfully started and the identifier of the cell that is managed by the base station 2 and for which a multicast service is successfully started, and/or gathers the identifier of the cell that is managed by the base station 1 and for which a multicast service fails to be started and the identifier of the cell that is managed by the base station 2 and for which a multicast service fails to be started, so as to obtain an identifier of a cell that is managed by the MCE 140 (including those managed by the base station 1 and the base station 2) and for which a multicast service is successfully started and/or an identifier of a cell that is managed by the MCE 140 and for which a multicast service fails to be started. The MCE 140 encapsulates, into a second multicast service session start response message, the identifier of the cell that is managed by the MCE 140 (including those managed by the base station 1 and the base station 2) and for which a multicast service is successfully started and/or the identifier of the cell that is managed by the MCE 140 and for which a multicast service fails to be started, and sends the second multicast service session start response message to the MME 130.

(4) After receiving a first multicast service session failure response message returned by the base station 1, the MCE 140 learns that a multicast service fails to be started for all the cells that are managed by the base station 1 and for which a multicast service needs to be started. After receiving a first multicast service session failure response message returned by the base station 2, the MCE 140 learns that a multicast service fails to be started for all the cells that are managed by the base station 2 and for which a multicast service needs to be started. Therefore, the MCE 140 generates a second multicast service session failure response message and sends the second multicast service session failure response message to the MME 130.

If the MME 130 receives the second multicast service session start response message, the MME 130 generates a third multicast service session start response message according to an identifier of a cell that is managed by the MCE 140 and for which a multicast service is successfully started and/or an identifier of a cell that is managed by the MCE 140 and for which a multicast service fails to be started, where the identifiers are in the second multicast service session start response message, and sends the third multicast service session start response message to the MBMS-GW 120. If the MME 130 receives the second multicast service session start failure message, the MME 130 generates a third multicast service session failure response message according to the second multicast service session start failure message, and sends the third multicast service session start failure message to the MBMS-GW 120.

If the MBMS-GW 120 receives the third multicast service session start response message, the MBMS-GW 120 generates a fourth multicast service session start response message according to the identifier of the cell that is managed by the MCE 140 and for which a multicast service is successfully started and/or the identifier of the cell that is managed by the MCE 140 and for which a multicast service fails to be started, where the identifiers are in the third multicast service session start response message, and sends the fourth multicast service session start response message to the BM-SC 110. If the MBMS-GW 120 receives the third multicast service session start failure message, the MBMS-GW 120 generates the third multicast service session failure response message according to the third multicast service session start failure message, and sends the fourth multicast service session start failure message to the BM-SC 110.

It may be understood that, if the BM-SC 110 needs to start a plurality of types of multicast services, the first to the fifth multicast service session start messages further include multicast service identifiers. After receiving the fourth multicast service session start message, the base station 1 starts, for the cells 1 to 3, multicast services corresponding to the multicast service identifiers. After receiving the fifth multicast service session start message, the base station 2 starts, for the cells 4 and 5, multicast services corresponding to the multicast service identifiers.

According to the foregoing solution, in the present disclosure, a multicast service session start response message included in a multicast service session start response message returned to the MCE includes an identifier of a cell for which a multicast service is successfully started among cells that are managed by a first base station and for which a multicast service session needs to be started, and/or an identifier of a cell for which a multicast service fails to be started among the cells that are managed by the first base station and for which a multicast service session needs to be started. Therefore, the MCE can learn of, according to the multicast service session start response message, the identifier of the cell for which a multicast service is successfully started among the cells that are managed by the first base station and for which a multicast service needs to be started, and/or the identifier of the cell for which a multicast service fails to be started among the cells that are managed by the first base station and for which a multicast service session needs to be started, and then determine a specific cell that is managed by the MCE 140 and for which a multicast service is successfully started, or a specific cell that is managed by the MCE 140 and for which a multicast service fails to be started.

Figure 4A:
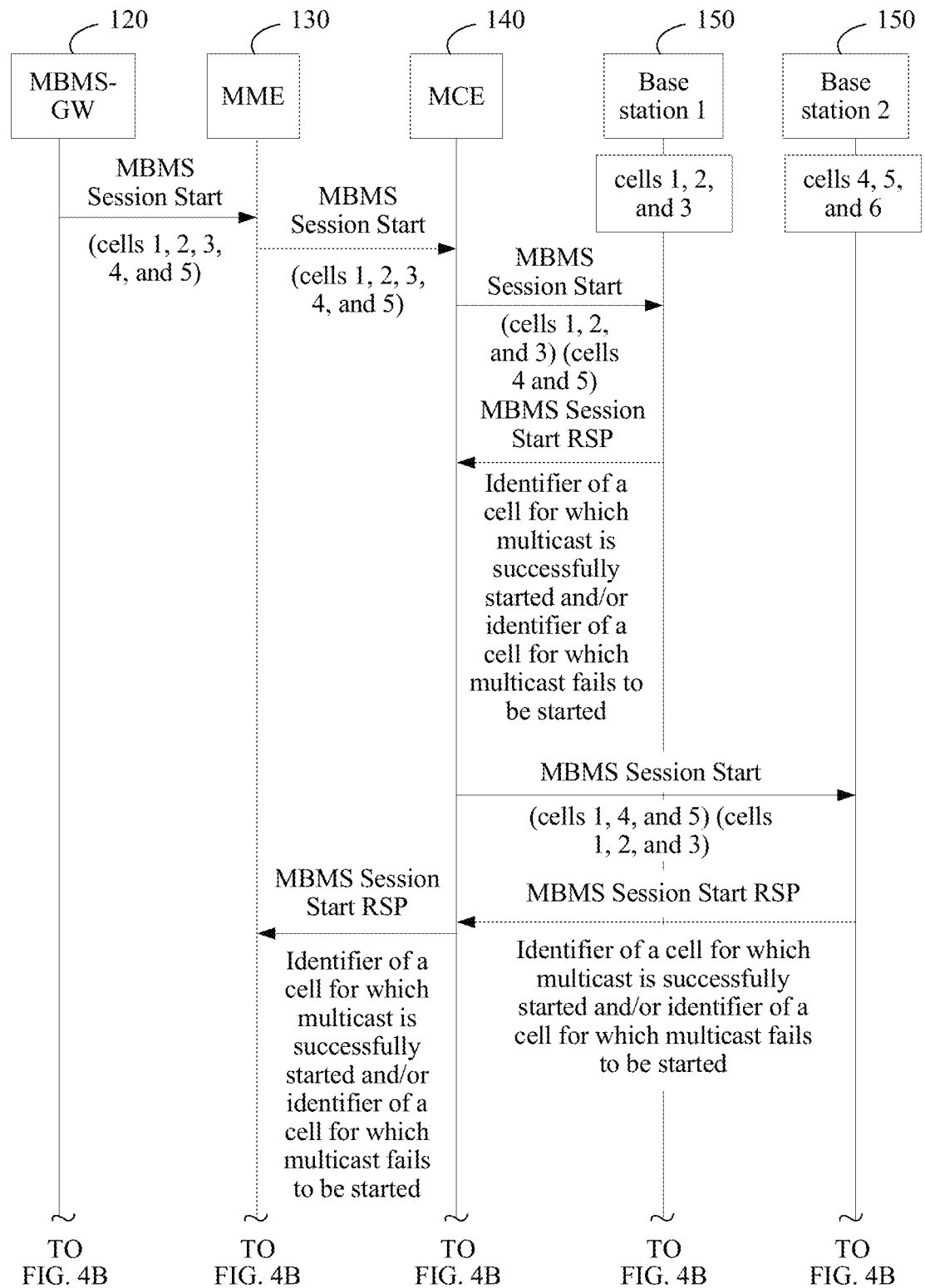
FIG. 4A and FIG. 4B are another interaction diagram of a multicast service based on an SC-PTM architecture according to the present disclosure.
Figure 4B:
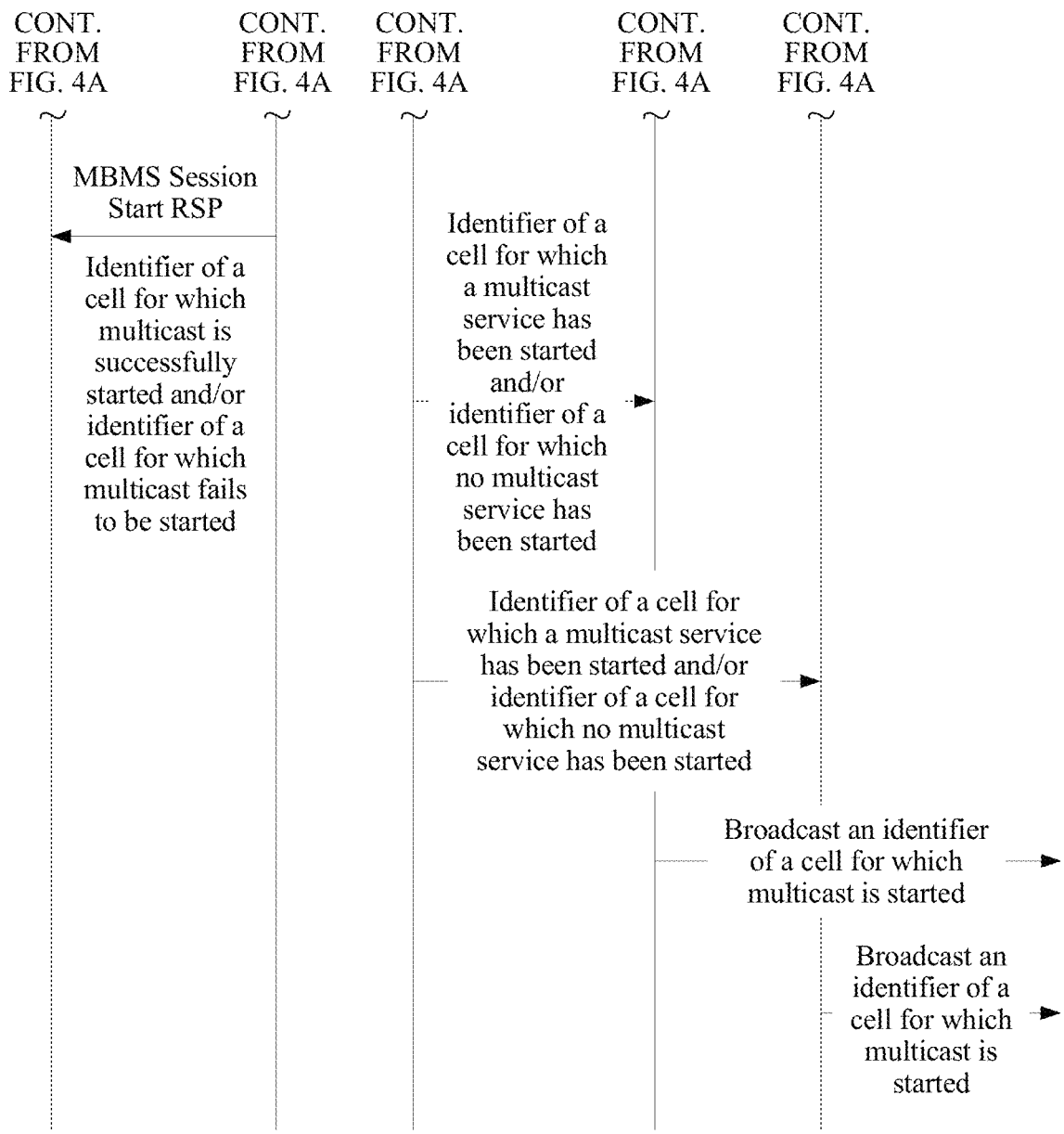

Refer to FIG. 4A and FIG. 4B. Differences between the embodiment shown in FIG. 4A and FIG. 4B and the embodiment shown in FIG. 3 are as follows: The fourth multicast service session start message sent by the MCE 140 to the base station 1 further includes the identifiers of the cells 4 and 5 that are managed by the base station 2 and for which a multicast service needs to be started, and the fifth multicast service session start message sent by the MCE 140 to the base station 2 further includes the identifiers of the cells 1 to 3 that are managed by the base station 1 and for which a multicast service needs to be started; or when the identifiers are organized in a form of a list, the fourth multicast service session start message sent by the MCE 140 to the base station 1 not only includes a cell list including the identifiers of the cells 1 to 3 that are managed by the base station 1 and for which a multicast service needs to be started, but also includes another cell list including the identifiers of the cells 4 and 5 that are managed by the base station 2 and for which a multicast service needs to be started, and the fifth multicast service session start message sent by the MCE 140 to the base station 2 not only includes a cell list including the identifiers of the cells 4 and 5 that are managed by the base station 2 and for which a multicast service needs to be started, but also includes another cell list including the identifiers of the cells 1 to 3 that are managed by the base station 1 and for which a multicast service needs to be started.

After receiving the fourth multicast service session start message sent by the MCE 140, the base station 1 learns, according to the identifiers, in the fourth multicast service session start message, of the cells that are managed by the base station 2 and for which a multicast service session needs to be started, the cells that are managed by the base station 2 and for which a multicast service needs to be started, and therefore learns that a multicast service needs to be started for the cells 4 and 5 of the base station 2. After receiving the fifth multicast service session start message sent by the MCE 140, the base station 2 learns, according to the identifiers, in the fifth multicast service session start message, of the cells that are managed by the base station 1 and for which a multicast service session needs to be started, the cells that are managed by the base station 1 and for which a multicast service needs to be started, and therefore learns that a multicast service needs to be started for the cells 1 to 3 of the base station 1.

It is assumed that, for the base station 1, a multicast service is successfully started for the cell 1 and the cell 2 and fails to be started for the cell 3, and for the base station 2, a multicast service is successfully started for the cell 4 and fails to be started for the cell 5. It can be learned from the embodiment shown in FIG. 3 that the MCE 140 encapsulates the identifiers of the cell 1, the cell 2, and the cell 4, and/or the identifiers of the cell 3 and the cell 5 into a multicast service session update message or a notification message that a multicast service is successfully started for a cell, and sends, to the base station 1 and the base station 2, the multicast service session update message or the notification message that a multicast service is successfully started for a cell. The multicast service session update message may further include indication information. The indication information is used to indicate that a cell identifier in the multicast service session update message is the identifier of the cell that is managed by the MCE 140 and for which a multicast service is successfully started and/or the identifier of the cell that is managed by the MCE 140 and for which a multicast service fails to be started. Alternatively, because the base station 1 already knows the identifier of the cell that is managed by the base station 1 and for which a multicast service is successfully started, the multicast service session update message or the notification message that a multicast service is successfully started for a cell is sent by the MCE 140 to the base station 1 and needs to include only the identifier of the cell that is managed by the base station 2 and for which a multicast service is successfully started and/or the identifier of the cell that is managed by the base station 2 and for which a multicast service fails to be started.

After receiving the multicast service session update message or the notification message that a multicast service is successfully started for a cell, the base station 1 can learn that among the cells that are managed by the base station 2 and for which a multicast service needs to be started, a multicast service is successfully started for the cell 4 and a multicast service fails to be started for the cell 5. Then, the base station 1 sends a notification to user equipment in the cells managed by the base station 1. The notification is used to notify the UE in the cells managed by the base station 1 of the cell that is managed by the base station 1 and for which a multicast service is successfully started and/or the cell that is managed by the base station 2 and for which a multicast service is successfully started, so that the UE can know a specific cell that is managed by the base station 1 and/or the base station 2 and for which a multicast service is started. Therefore, in a movement process, if the UE moves to a cell that is managed by the base station 1 and/or the base station 2 and for which a multicast service is successfully started, the UE directly receives the multicast service, or if the UE moves to a cell that is managed by the base station 1 and/or the base station 2 and for which a multicast service fails to be started or no multicast service is started, the UE quickly determines whether a unicast bearer needs to be started, to continue to receive a multicast service. The message of the cell for which a multicast service is successfully started may be an identifier of the cell for which a multicast service is successfully started or an identifier that is represented in another form and that is of the cell for which a multicast service is successfully started. For example, the identifier of the cell for which a multicast service is successfully started may also be represented using a bitmap indicator sequence. The bitmap indicator sequence includes a plurality of bits. The bits in the bitmap indicator sequence correspond to the identifiers of the cells managed by the base station 1 and/or the identifiers of the cells managed by the base station 2. Values of the bits in the bitmap indicator sequence are used to indicate specific cells that are of the cells indicated by corresponding cell identifiers and for which a multicast service is successfully started. In a specific embodiment, a bitmap indicator sequence is shown in Table 1.

TABLE 1

Bitmap indicator sequence table

|  | Identifier of the cell 1 | Identifier of the cell 2 | Identifier of the cell 3 | Identifier of the cell 4 | Identifier of the cell 5 | Identifier of the cell 6 |
| --- | --- | --- | --- | --- | --- | --- |
| Service identifier 1 | 1 | 1 | 0 | 1 | 0 | 0 |
| Service identifier 2 | * | * | * | * | * | * |
| Service identifier 3 | * | * | * | * | * | * |
| Service identifier 4 | * | * | * | * | * | * |
| ... | ... | ... | ... | ... | ... | ... |

A first row in Table 1 indicates the identifiers of the cells managed by the base station 1 and the base station 2. A second row in Table 1 indicates a bitmap indicator sequence 110100 of a multicast service whose multicast service identifier is the service identifier 1. When a value of a bit in the bitmap indicator sequence is 1, it indicates that a multicast service is successfully started for a cell represented by a corresponding cell identifier, and when a value of a bit in the bitmap indicator sequence is 0, it indicates that a multicast service fails to be started or no multicast service is started for a cell represented by a corresponding cell identifier. Therefore, the bitmap indicator sequence 110100 indicates that the multicast service whose multicast service identifier is the service identifier 1 is successfully started for the cell 1, the cell 2, and the cell 4 and a multicast service fails to be started or no multicast service is started for the cell 3 and the cell 6. When there are a plurality of multicast services, each multicast service may be represented by using a same bitmap indicator sequence, so that the bitmap indicator sequence is used to replace identifiers of cells sent each time and waste of transmission resources is reduced.

A processing process of the base station 2 is similar to that of the base station 1, and details are not described herein.

Figure 5A:
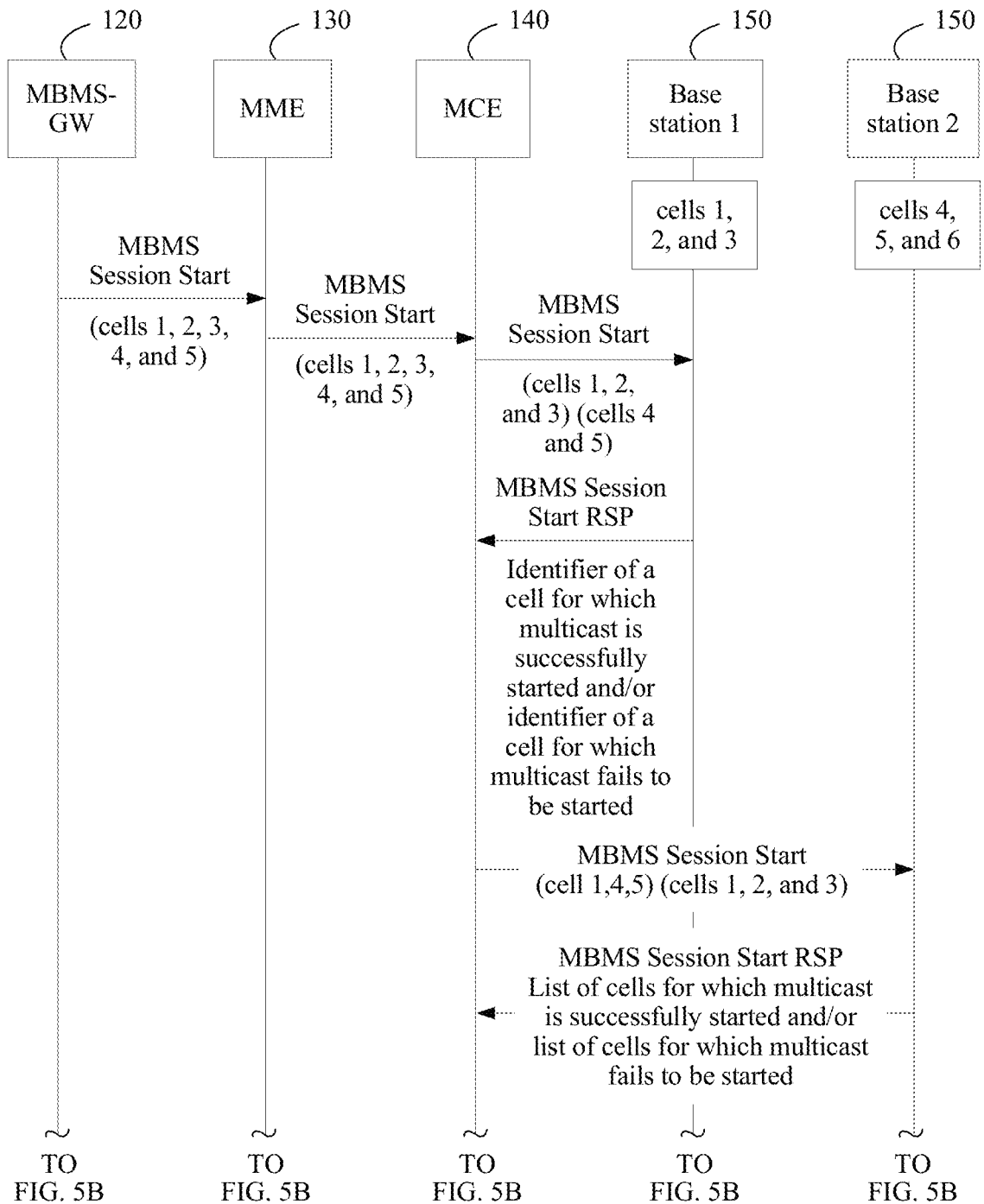
FIG. 5A and FIG. 5B are still another interaction diagram of a multicast service based on an SC-PTM architecture according to the present disclosure.
Figure 5B:
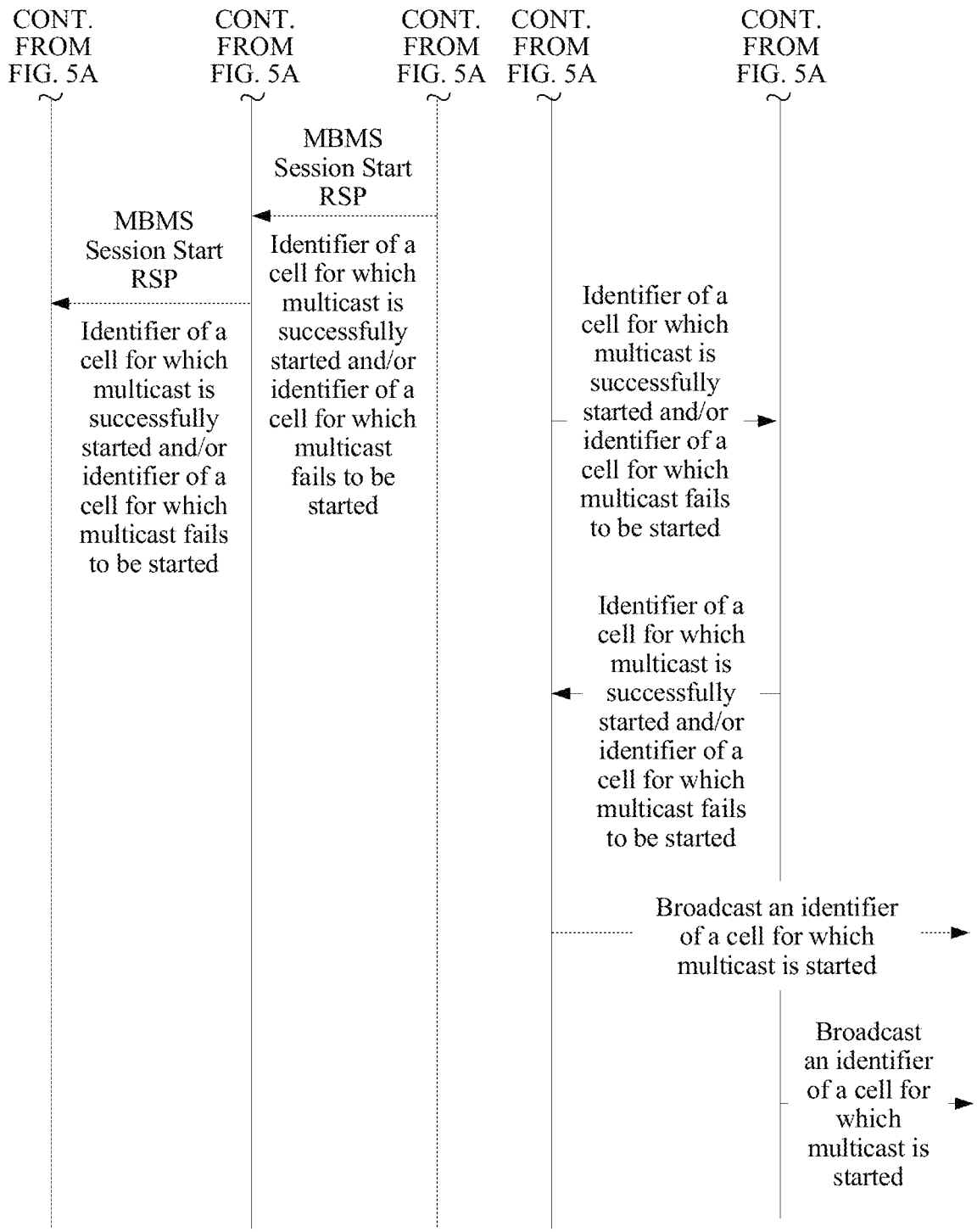

Refer to FIG. 5A and FIG. 5B. Differences between the embodiment shown in FIG. 5A and FIG. 5B and the embodiment shown in FIG. 4A and FIG. 4B are as follows: The MCE 140 does not need to send, to the base station 1 and the base station 2, the identifier of the cell that is managed by the MCE 140 and for which a multicast service is successfully started and/or the identifier of the cell that is managed by the MCE 140 and for which a multicast service fails to be started, to notify the base station 1 and the base station 2 of a specific cell for which a multicast service is successfully started and a specific cell for which a multicast service fails to be started.

Instead, after starting a multicast service for a cell, the base station 1 sends, to the base station 2, the identifier of the cell that is managed by the base station 1 and for which a multicast service is successfully started, and/or the identifier of the cell that is managed by the base station 1 and for which a multicast service fails to be started. Alternatively, after the base station 1 starts a multicast service for a cell, if a multicast service fails to be started for one or more of the cells managed by the base station 1, the base station 1 sends, to the base station 2, the identifier of the cell that is managed by the base station 1 and for which a multicast service is successfully started, and/or the identifier of the cell that is managed by the base station 1 and for which a multicast service fails to be started; and if a multicast service is successfully started for all the cells managed by the base station 1, the base station 1 does not need to send, to the base station 2, the identifier of the cell that is managed by the base station 1 and for which a multicast service is successfully started, and/or the identifier of the cell that is managed by the base station 1 and for which a multicast service fails to be started. If the base station 2 receives, within a specific period of time, no identifier of a cell that is managed by the base station 1 and for which a multicast service is successfully started and/or no identifier of a cell that is managed by the base station 1 and for which a multicast service fails to be started, where the identifiers are sent by the base station 1, the base station 2 considers by default that a multicast service is successfully started for all the cells that are managed by the base station 1, that are obtained by using the fifth multicast service session start message, and for which a multicast service needs to be started, so as to save transmission resources. In addition, the base station 1 also receives the identifier of the cell that is managed by the base station 2 and for which a multicast service is successfully started, and/or the identifier of the cell that is managed by the base station 2 and for which a multicast service fails to be started, where the identifiers are sent by the base station 2, and obtains, according to the identifier of the cell that is managed by the base station 2 and for which a multicast service is successfully started, and/or the identifier of the cell that is managed by the base station 2 and for which a multicast service fails to be started, where the identifiers are sent by the base station 2, the identifier of the cell for which a multicast service is successfully started among the cells managed by the base station 2, to learn of a specific cell for which a multicast service is successfully started and a specific cell for which a multicast service fails to be started among the cells managed by the base station 2.

A processing process of the base station 2 is similar to that of the base station 1, and details are not described herein.

In the foregoing embodiments, if more than one identifier is included in a message, the identifiers may be organized in a form of a list, a bitmap, or the like to facilitate transmission.

Figure 6:
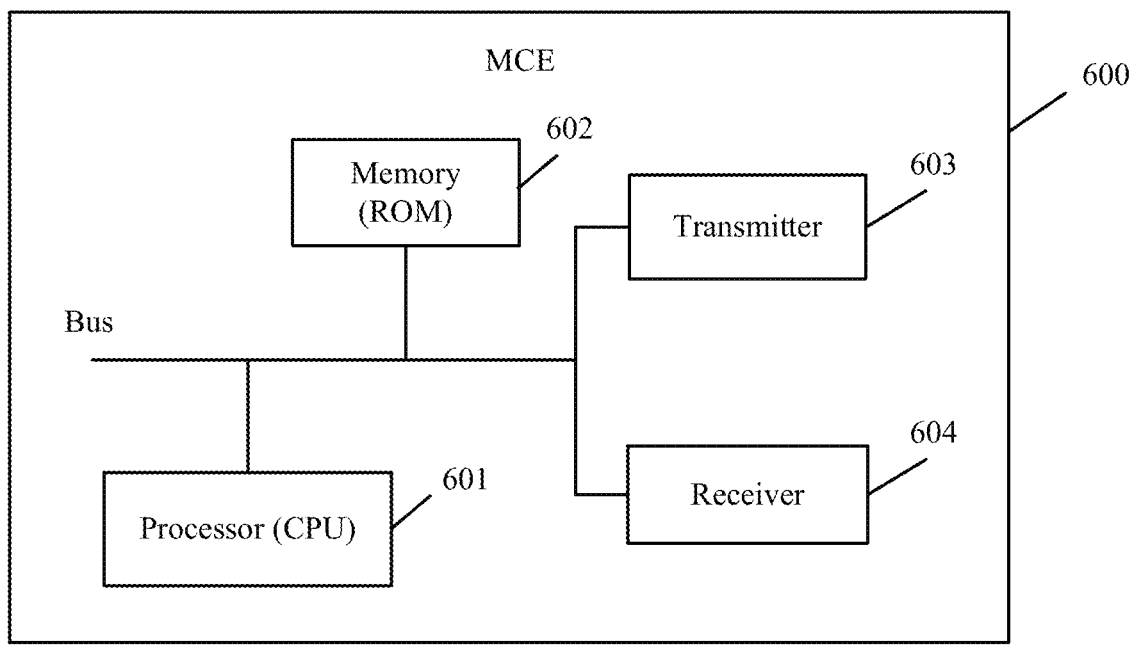
FIG. 6 is a schematic structural diagram of an MCE according to the present disclosure.

Referring to FIG. 6, FIG. 6 is a schematic structural diagram of an MCE 600 according to the present disclosure. The MCE 600 in this embodiment includes a processor 601, a memory 602, a transmitter 603, and a receiver 604. The processor 601, the memory 602, the transmitter 603, and the receiver 604 are connected by using a bus.

The processor 601 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 602 may be configured to store a software program and a module, and the processor 601 runs the software program and the module that are stored in the memory 602, to perform various functional applications and process data. The memory 602 may mainly include a program storage area and a data storage area. The program storage area may store an operating system, an application program that is required by at least one function (such as a sound playing function or an image playing function), and the like. The data storage area may store data that is created according to usage of the MCE 600. In addition, the memory 602 may include a high-speed random access memory, or may include a non-volatile memory, for example, at least one magnetic disk storage device, a flash device, or another volatile solid-state storage device. Correspondingly, the memory 602 may further include a storage controller, so as to provide the processor 601 with access to the memory 602.

The transmitter 603 and the receiver 604 may be separate or integrated together. The transmitter 603 and the receiver 604 may use an antenna to transmit a wireless signal to transmit the signal to another device or use an optical fiber to transmit an optical signal to another device. When the transmitter 603 and the receiver 604 use an antenna to transmit a wireless signal to transmit the signal to another device, the transmitter 603 and the receiver 604 include a resonator, a modem, an amplifier, and the like. When the transmitter 603 and the receiver 604 use an optical fiber to transmit an optical signal to another device, the transmitter 603 and the receiver 604 include an optical coupler, an optical modem, an amplifier, and the like.

When the MCE 600 is operating, one or more processors execute one or more programs stored in the memory 602 to execute instructions for the following operations:

The transmitter 603 sends a first multicast service session start message to a first base station, where the first multicast service session start message includes identifiers of cells that are managed by the first base station and for which a multicast service session needs to be started.

The receiver 604 receives a first multicast service session start failure message or a first multicast service session start response message that is returned by the first base station, where the first multicast service session start failure message is used to indicate that a multicast service fails to be started for all the cells that are managed by the first base station and for which a multicast service session needs to be started, and the first multicast service session start response message includes an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started.

Optionally, the first multicast service session start message further includes identifiers of cells that are managed by a second base station and for which a multicast service session needs to be started.

The transmitter 603 is configured to send a second multicast service session start message to the second base station, where the second multicast service session start message includes the identifiers of the cells that are managed by the second base station and for which a multicast service session needs to be started.

The receiver 604 is configured to receive a second multicast service session start failure message or a second multicast service session start response message that is returned by the second base station, where the second multicast service session start failure message is used to indicate that a multicast service fails to be started for all the cells that are managed by the second base station and for which a multicast service session needs to be started, and the second multicast service session start response message includes an identifier of a cell for which a multicast service is successfully started among the cells that are managed by the second base station and for which a multicast service session needs to be started, and/or an identifier of a cell for which a multicast service fails to be started among the cells that are managed by the second base station and for which a multicast service session needs to be started.

Optionally, the transmitter 603 is configured to send, to the first base station, the identifier of the cell that is managed by the second base station and for which a multicast service is successfully started and/or the identifier of the cell that is managed by the second base station and for which a multicast service fails to be started.

Optionally, the transmitter 603 is configured to send, to a mobility management entity MME, at least one piece of the following information: the identifier of the cell that is managed by the first base station and for which a multicast service is successfully started, the identifier of the cell that is managed by the first base station and for which a multicast service fails to be started, the identifier of the cell that is managed by the second base station and for which a multicast service is successfully started, or the identifier of the cell that is managed by the second base station and for which a multicast service fails to be started.

Optionally, the processor 601 is configured to: determine whether a received multicast service session start message sent by a mobility management entity MME includes identifiers of cells that are managed by the MCE and for which a multicast service session needs to be started; and when none of the identifiers of cells that are managed by the MCE and for which a multicast service session needs to be started is included, invoke the transmitter 603 to send a multicast service session start response message to the MME, where the multicast service session start response message includes indication information that is used to indicate that a cell list in the multicast service session start message is out of a management range of the MCE.

Optionally, the multicast service session start response message is multicast service session start response information with an out-of-range mark, where the out-of-range mark is a field or a bit specified in the multicast service session start response information.

According to the foregoing solution, in the present disclosure, a multicast service session start response message included in a multicast service session start response message returned to the MCE includes an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started. Therefore, the MCE can learn of, according to the multicast service session start response message, the identifier of the cell for which a multicast service is successfully started among the cells that are managed by the first base station and for which a multicast service session needs to be started, and/or the identifier of the cell for which a multicast service fails to be started among the cells that are managed by the first base station and for which a multicast service session needs to be started, and then determine a specific cell that is managed by the MCE 140 and for which a multicast service is successfully started, or a specific cell that is managed by the MCE 600 and for which a multicast service fails to be started.

Figure 7:
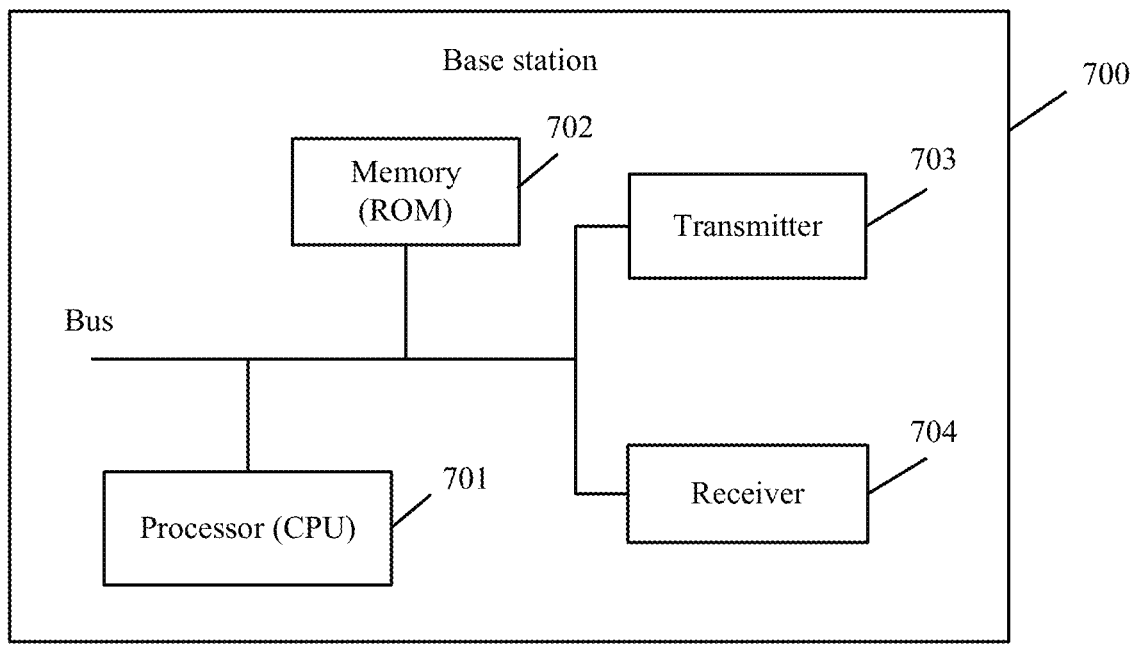
FIG. 7 is a schematic structural diagram of a base station according to the present disclosure.

Referring to FIG. 7, FIG. 7 is a schematic structural diagram of a base station according to the present disclosure. The base station 700 in this embodiment includes a processor 701, a memory 702, a transmitter 703, and a receiver 704. The processor 701, the memory 702, the transmitter 703, and the receiver 704 are connected by using a bus.

The processor 701 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 702 may be configured to store a software program and a module, and the processor 701 runs the software program and the module that are stored in the memory 702, to perform various functional applications and process data. The memory 702 may mainly include a program storage area and a data storage area. The program storage area may store an operating system, an application program that is required by at least one function (such as a sound playing function or an image playing function), and the like. The data storage area may store data that is created according to usage of the base station 700. In addition, the memory 702 may include a high-speed random access memory, or may include a non-volatile memory, for example, at least one magnetic disk storage device, a flash device, or another volatile solid-state storage device. Correspondingly, the memory 702 may further include a storage controller, so as to provide the processor 701 with access to the memory 702.

The transmitter 703 and the receiver 704 may be separate or integrated together. The transmitter 703 and the receiver 704 may use an antenna to transmit a wireless signal to transmit the signal to another device or use an optical fiber to transmit an optical signal to another device. When the transmitter 703 and the receiver 704 use an antenna to transmit a wireless signal to transmit the signal to another device, the transmitter 703 and the receiver 704 include a resonator, a modem, an amplifier, and the like. When the transmitter 703 and the receiver 704 use an optical fiber to transmit an optical signal to another device, the transmitter 703 and the receiver 704 include an optical coupler, an optical modem, an amplifier, and the like.

When the base station 700 is operating, one or more processors execute one or more programs stored in the memory 702 to execute instructions for the following operations:

The receiver 704 is configured to receive a multicast service session start message sent by a multicast coordination entity MCE, where the multicast service session start message includes identifiers of cells that are managed by the first base station and for which a multicast service session needs to be started.

The transmitter 703 is configured to send a multicast service session start failure message or a multicast service session start response message to the MCE, where the multicast service session start failure message is used to indicate that a multicast service fails to be started for all the cells that are managed by the first base station and for which a multicast service session needs to be started, and the multicast service session start response message includes an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started.

Optionally, the multicast service session start message further includes identifiers of cells that are managed by a second base station and for which a multicast service session needs to be started.

The processor 701 is configured to: start a multicast service according to the identifiers of the cells that are managed by the first base station and for which a multicast service session needs to be started, and learn, according to the identifiers of the cells that are managed by the second base station and for which a multicast service session needs to be started, the cells that are managed by the second base station and for which a multicast service needs to be started.

Optionally, the receiver 704 is configured to receive an identifier of a cell that is managed by the second base station and for which a multicast service is successfully started and/or an identifier of a cell that is managed by the second base station and for which a multicast service fails to be started, where the identifiers are sent by the MCE.

Optionally, the transmitter 703 is configured to send, to the second base station when a multicast service fails to be started for one or more of the cells managed by the first base station, an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started; or the transmitter 703 is configured to send, to the second base station, an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started.

Optionally, the receiver 704 is configured to receive an identifier of a cell for which a multicast service is successfully started among the cells that are managed by the second base station and for which a multicast service session needs to be started, and/or an identifier of a cell for which a multicast service fails to be started among the cells that are managed by the second base station and for which a multicast service session needs to be started, where the identifiers are sent by the second base station.

Optionally, the transmitter 703 is configured to send a notification to user equipment UE, where the notification is used to notify the UE of the cell that is managed by the first base station and for which a multicast service is successfully started and/or the cell that is managed by the second base station and for which a multicast service is successfully started.

Optionally, the notification includes a bitmap indicator bit, and the bitmap indicator bit indicates the cell that is managed by the first base station and/or the second base station and for which a multicast service is successfully started.

According to the foregoing solution, in the present disclosure, a multicast service session start response message included in a multicast service session start response message returned to the MCE includes an identifier of a cell for which a multicast service is successfully started among the cells that are managed by the first base station and for which a multicast service session needs to be started, and/or an identifier of a cell for which a multicast service fails to be started among the cells that are managed by the first base station and for which a multicast service session needs to be started. Therefore, the MCE can learn of, according to the multicast service session start response message, the identifier of the cell for which a multicast service is successfully started among the cells that are managed by the first base station and for which a multicast service session needs to be started, and/or the identifier of the cell for which a multicast service fails to be started among the cells that are managed by the first base station and for which a multicast service session needs to be started, and then determine a specific cell that is managed by the MCE 140 and for which a multicast service is successfully started, or a specific cell that is managed by the MCE and for which a multicast service fails to be started.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

What is disclosed above is merely example embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A cell multicast service processing method, comprising:
    receiving, by a first base station, a multicast service session start message sent by a multicast coordination entity (MCE), wherein the multicast service session start message comprises identifiers of cells that are managed by the first base station and for which a multicast service session is to be started; and
    sending, by the first base station, a multicast service session start failure message when a multicast service fails to be started for all the cells that are managed by the first base station and a multicast service session start response message to the MCE when the multicast service is to be started for at least one cell managed by the first base station, wherein the multicast service session start failure message is used to indicate that the multicast service fails to be started for all the cells that are managed by the first base station and for which the multicast service session is to be started, and the multicast service session start response message comprises an identifier for each cell for which the multicast service is successfully started among the cells that are managed by the first base station and for which the multicast service session is to be started and an identifier for each cell for which the multicast service fails to be started among the cells that are managed by the first base station and for which the multicast service session is to be started.

2. The method according to claim 1, wherein the multicast service session start message further comprises identifiers of cells that are managed by a second base station and for which the multicast service session is to be started; and
    after the receiving, by the first base station, the multicast service session start message sent by the MCE, and before the sending, by the first base station, the multicast service session start failure message or the multicast service session start response message to the MCE, the method further comprises:
    starting, by the first base station, the multicast service according to the identifiers of the cells that are managed by the first base station and for which the multicast service session is to be started, and learning, according to the identifiers of the cells that are managed by the second base station and for which the multicast service session is to be started, the cells that are managed by the second base station and for which the multicast service is to be started.

3. The method according to claim 2, wherein
    after the sending, by the first base station, the multicast service session start failure message or the multicast service session start response message to the MCE, the method comprises:
    receiving one or more of an identifier of a cell that is managed by the second base station and for which the multicast service is successfully started and an identifier of the cell that is managed by the second base station and for which the multicast service fails to be started, wherein the identifiers are sent by the MCE.

4. The method according to claim 1, wherein after the receiving, by the first base station, the multicast service session start message sent by the MCE, the method comprises:
    sending, to the second base station if the multicast service fails to be started for one or more of the cells managed by the first base station, one or more of an identifier of a cell for which the multicast service is successfully started among the cells that are managed by the first base station and for which the multicast service session is to be started and an identifier of a cell for which the multicast service fails to be started among the cells that are managed by the first base station and for which the multicast service session is to be started.

5. The method according to claim 1, wherein the method further comprises:
    receiving one or more of an identifier of a cell for which the multicast service is successfully started among the cells that are managed by the second base station and for which the multicast service session is to be started and an identifier of a cell for which the multicast service fails to be started among the cells that are managed by the second base station and for which the multicast service session is to be started, wherein the identifiers are sent by the second base station.

6. The method according to claim 5, wherein after the receiving the multicast service session start message sent by the MCE and the receiving one or more of the identifier of the cell for which the multicast service is successfully started among the cells that are managed by the second base station and for which the multicast service session is to be started and the identifier of the cell for which the multicast service fails to be started among the cells that are managed by the second base station and for which the multicast service session is to be started, wherein the identifiers are sent by the second base station, the method further comprises:

sending a notification to user equipment (UE), wherein the notification is used to notify the UE of one or more of the cell that is managed by the first base station and for which the multicast service is successfully started and the cell that is managed by the second base station and for which the multicast service is successfully started.

7. The method according to claim 6, wherein the notification comprises a bitmap indicator bit, and the bitmap indicator bit indicates one or more of the cell that is managed by the first base station and the second base station and for which the multicast service is successfully started.

8. A cell multicast service processing method, comprising:
sending, by a multicast coordination entity (MCE), a first multicast service session start message to a first base station, wherein the first multicast service session start message comprises identifiers of cells that are managed by the first base station and for which a multicast service session is to be started; and
receiving, by the MCE from the first base station, a first multicast service session start failure message when a multicast service fails to be started for all the cells that are managed by the first base station and a first multicast service session start response message when the multicast service is to be started for at least one cell managed by the first base station, wherein the first multicast service session start failure message is used to indicate that the multicast service fails to be started for all the cells that are managed by the first base station and for which the multicast service session is to be started, and the first multicast service session start response message comprises an identifier for each cell for which the multicast service is successfully started among the cells that are managed by the first base station and for which the multicast service session is to be started and an identifier for each cell for which the multicast service fails to be started among the cells that are managed by the first base station and for which the multicast service session is to be started.

9. The method according to claim 8, wherein the first multicast service session start message further comprises identifiers of cells that are managed by a second base station and for which the multicast service session is to be started, and the method further comprises:
sending, by the MCE, a second multicast service session start message to the second base station, wherein the second multicast service session start message comprises the identifiers of the cells that are managed by the second base station and for which the multicast service session is to be started; and
receiving, by the MCE, a second multicast service session start failure message or a second multicast service session start response message that is returned by the second base station, wherein the second multicast service session start failure message is used to indicate that the multicast service fails to be started for all the cells that are managed by the second base station and for which the multicast service session is to be started, and the second multicast service session start response message comprises one or more of an identifier of a cell for which the multicast service is successfully started among the cells that are managed by the second base station and for which the multicast service session is to be started and an identifier of a cell for which the multicast service fails to be started among the cells that are managed by the second base station and for which the multicast service session is to be started.

10. The method according to claim 9, wherein after the receiving, by the MCE, the first multicast service session start failure message or the first multicast service session start response message that is returned by the first base station, the method further comprises:
sending, to the first base station, one or more of the identifier of the cell that is managed by the second base station and for which the multicast service is successfully started and the identifier of the cell that is managed by the second base station and for which the multicast service fails to be started.

11. The method according to claim 10, further comprising:
sending, by the MCE to the mobility management entity MME, at least one piece of the following information: the identifier of the cell that is managed by the first base station and for which the multicast service is successfully started, the identifier of the cell that is managed by the first base station and for which the multicast service fails to be started, the identifier of the cell that is managed by the second base station and for which the multicast service is successfully started, or the identifier of the cell that is managed by the second base station and for which the multicast service fails to be started.

12. A base station, wherein the base station is a first base station, and the first base station comprises a receiver and a transmitter, wherein
the receiver is configured to receive a multicast service session start message sent by a multicast coordination entity (MCE), wherein the multicast service session start message comprises identifiers of cells that are managed by the first base station and for which a multicast service session is to be started; and
the transmitter is configured to send a multicast service session start failure message when a multicast service fails to be started for all the cells that are managed by the first base station and a multicast service session start response message to the MCE when the multicast service is to be started for at least one cell managed by the first base station, wherein the multicast service session start failure message is used to indicate that the multicast service fails to be started for all the cells that are managed by the first base station and for which the multicast service session is to be started, and the multicast service session start response message comprises an identifier for each cell for which the multicast service is successfully started among the cells that are managed by the first base station and for which the multicast service session is to be started and an identifier for each cell for which the multicast service fails to be started among the cells that are managed by the first base station and for which the multicast service session is to be started.

13. The base station according to claim 12, wherein the multicast service session start message further comprises identifiers of cells that are managed by a second base station and for which the multicast service session is to be started, and the base station further comprises a processor, wherein
the processor is configured to: start the multicast service according to the identifiers of the cells that are managed by the first base station and for which the multicast service session is to be started, and learn, according to the identifiers of the cells that are managed by the second base station and for which the multicast service session is to be started, the cells that are managed by the second base station and for which the multicast service is to be started.

14. The base station according to claim 13, wherein the receiver is configured to receive one or more of an identifier of a cell that is managed by the second base station and for which the multicast service is successfully started and an identifier of a cell that is managed by the second base station and for which the multicast service fails to be started, wherein the identifiers are sent by the MCE.

15. The base station according to claim 12, wherein the transmitter is configured to send, to the second base station when the multicast service fails to be started for one or more of the cells managed by the first base station, one or more of an identifier of a cell for which the multicast service is successfully started among the cells that are managed by the first base station and for which the multicast service session is to be started and an identifier of a cell for which the multicast service fails to be started among the cells that are managed by the first base station and for which the multicast service session is to be started; or
the transmitter is configured to send, to the second base station, one or more of an identifier of a cell for which the multicast service is successfully started among the cells that are managed by the first base station and for which the multicast service session is to be started and an identifier of a cell for which the multicast service fails to be started among the cells that are managed by the first base station and for which the multicast service session is to be started.

16. The base station according to claim 12, wherein the receiver is configured to receive one or more of an identifier of a cell for which the multicast service is successfully started among the cells that are managed by the second base station and for which the multicast service session is to be started and an identifier of a cell for which the multicast service fails to be started among the cells that are managed by the second base station and for which the multicast service session is to be started, wherein the identifiers are sent by the second base station.

17. The base station according to claim 16, wherein the transmitter is configured to send a notification to user equipment UE, wherein the notification is used to notify the UE of one or more of the cell that is managed by the first base station and for which the multicast service is successfully started and the cell that is managed by the second base station and for which the multicast service is successfully started.

18. The base station according to claim 17, wherein the notification comprises a bitmap indicator bit, and the bitmap indicator bit indicates one or more of the cell that is managed by the first base station and the second base station and for which the multicast service is successfully started.

\* \* \* \* \*